United States Patent [19]
Highlen et al.

[11] Patent Number: 5,314,214
[45] Date of Patent: May 24, 1994

[54] FLEXIBLE JOINT

[75] Inventors: John L. Highlen, Rives Junction; Alan K. Clark, Jackson, both of Mich.

[73] Assignee: Aeroquip Corporation, Maumee, Ohio

[21] Appl. No.: 39,805

[22] Filed: Mar. 29, 1993

Related U.S. Application Data

[63] Continuation of Ser. No. 862,329, Apr. 2, 1992, abandoned.

[51] Int. Cl.⁵ .............................................. F16L 27/00
[52] U.S. Cl. ................................... 285/233; 285/49; 285/261; 285/231
[58] Field of Search ............... 285/233, 234, 49, 50, 285/52, 231, 235, 236, 261, 267, 223, 374

[56] References Cited

U.S. PATENT DOCUMENTS

| | | | |
|---|---|---|---|
| 1,543,348 | 6/1925 | Venton . | |
| 2,047,976 | 7/1936 | Lord | 287/85 |
| 2,126,706 | 8/1938 | Schmidt | 285/90 |
| 2,204,316 | 6/1940 | Miller et al. | 285/234 |
| 2,229,587 | 1/1941 | Parker | 285/233 |
| 2,273,395 | 2/1942 | Couty | 285/90 |
| 2,396,078 | 3/1946 | Box | 285/761 |
| 2,477,533 | 7/1949 | Whiting | 285/374 |
| 2,504,634 | 4/1950 | Boschi | 285/90 |
| 2,574,191 | 11/1951 | Platzer | 285/52 |
| 2,657,076 | 10/1953 | Hubbell | 285/91 |
| 2,836,436 | 5/1958 | Bianchi | 285/113 |
| 2,867,463 | 1/1959 | Snider | 285/52 |
| 3,115,354 | 12/1963 | Bowan et al. | 285/52 |
| 3,504,904 | 4/1970 | Irwin et al. | 267/1 |
| 3,576,335 | 4/1971 | Kowal | 285/233 |
| 3,792,878 | 2/1974 | Freeman | 285/137 |
| 4,068,864 | 1/1978 | Herbert et al. | 285/49 |
| 4,121,861 | 10/1978 | Gorndt | 285/223 |
| 4,183,556 | 1/1980 | Schwemmer | 285/51 |
| 4,198,078 | 4/1980 | Herbert | 285/234 |
| 4,273,363 | 6/1981 | Angel | 285/47 |
| 4,349,184 | 9/1982 | Peterson et al. | 267/153 |
| 4,398,755 | 8/1983 | Gureghian | 285/223 |
| 4,570,979 | 2/1986 | Moore | 285/223 |
| 4,626,003 | 12/1986 | Williams et al. | 285/276 |
| 4,659,117 | 4/1987 | Holzhausen et al. | 285/49 |
| 4,863,200 | 9/1989 | Brandener | 285/234 |
| 4,906,027 | 3/1990 | DeGruijter | 285/51 |
| 4,974,881 | 12/1990 | Engel et al. | 285/181 |
| 5,013,072 | 5/1991 | Roth | 285/233 |
| 5,024,454 | 6/1991 | McGilp et al. | 277/207 |
| 5,127,681 | 7/1992 | Thelen et al. | 285/773 |
| 5,129,685 | 7/1992 | Engel | 285/231 |
| 5,141,259 | 8/1992 | Highlen et al. | 285/49 |
| 5,248,168 | 9/1993 | Chichester et al. | 285/233 |

*Primary Examiner*—Eric K. Nicholson
*Attorney, Agent, or Firm*—Emch, Schaffer, Schaub & Porcello

[57] ABSTRACT

A flexible joint for the connecting and sealing of tubular sections that includes a flexible pad having inner and outer surfaces. A contoured portion extends around the inner surface of the pad. The flexible joint further includes a first tubular section having a raised portion. The raised portion engages the contoured portion on the inner surface of the pad. A second tubular section includes a housing. The housing has exterior and interior surfaces. The interior surface of the housing engages the outer surface of the pad for retaining the pad in a sealing relationship with the first tubular section.

18 Claims, 2 Drawing Sheets

FLEXIBLE JOINT

This is a continuation of copending application Ser. No. 07/862,329 filed on Apr. 2, 1992, now abandoned.

FIELD OF INVENTION

The present invention is directed generally to a flexible joint for the sealing of tubular sections. More specifically, the invention is directed to a flexible joint having a flexible pad positioned between aligned tubular sections to provide a flexible, sealed connection.

BACKGROUND OF THE INVENTION

Flexible joints are used for the joining of tubing in, for example automobile fluid conveying systems. The flexible joints must be capable of bending, twisting and moving axially in response to forces on the tubing. The flexible joints must also preferably provide sound and vibration dampening. The present invention meets the above requirements and also provides a relatively inexpensive and easy to manufacture flexible joint.

SUMMARY OF THE INVENTION

The present invention is directed to a flexible joint for the connecting and sealing of tubular sections. The flexible joint includes a flexible pad having inner and outer surfaces. A contoured portion extends around the inner surface of the pad. The flexible joint further includes a first tubular section having an annular raised portion. The raised portion engages the contoured portion on the inner surface of the pad. A second tubular section includes an annular housing. The housing has exterior and interior surfaces. The interior surface of the housing engages the outer surface of the pad for retaining the pad in a sealing relationship with the first tubular section.

The primary object of the present invention is to provide a flexible joint for tubing that can move in response to forces on such tubing while providing a superior seal.

An important object of the invention is to provide a flexible joint that is inexpensive and easy to manufacture.

Other objects and advantages will become apparent as the invention is described hereinafter in detail with reference being made to the accompanying drawings.

DETAILED DESCRIPTION OF THE PREFERRED EMBODIMENTS

Figure 1:
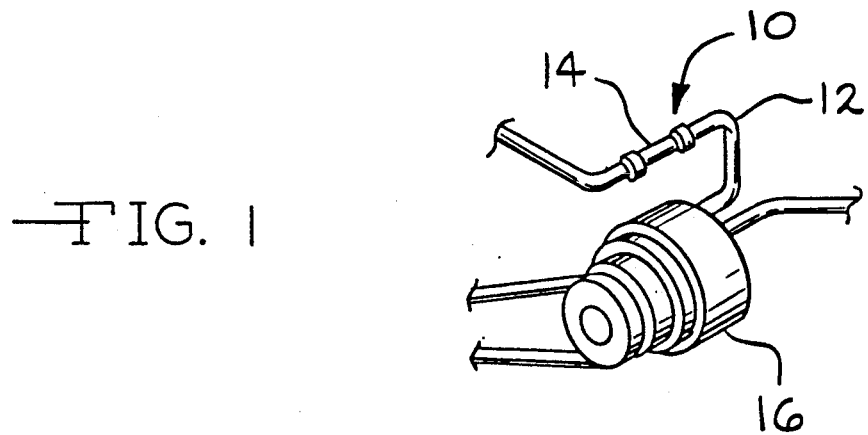
FIG. 1 is a perspective view of a flexible joint, according to the present invention, connected to an automobile air conditioning compressor.

Referring now to the drawings, the preferred embodiments of the present invention are shown. Referring to FIG. 1, the flexible joint of the present invention is indicated by reference number 10. The flexible joint 10 includes a first tubular section 12 and a second tubular section 14. In the FIG. 1 embodiment, the first tubular section 12 is in communication with an automobile air conditioning compressor 16. However, it will be appreciated by those skilled in the art that the flexible joint of the present invention can be used in many automotive and nonautomotive fluid conveying systems depending on the application. At least two flexible joints are usually required to provide the necessary degrees of freedom to insure proper alignment of the several tubular sections in a system.

Figure 2:
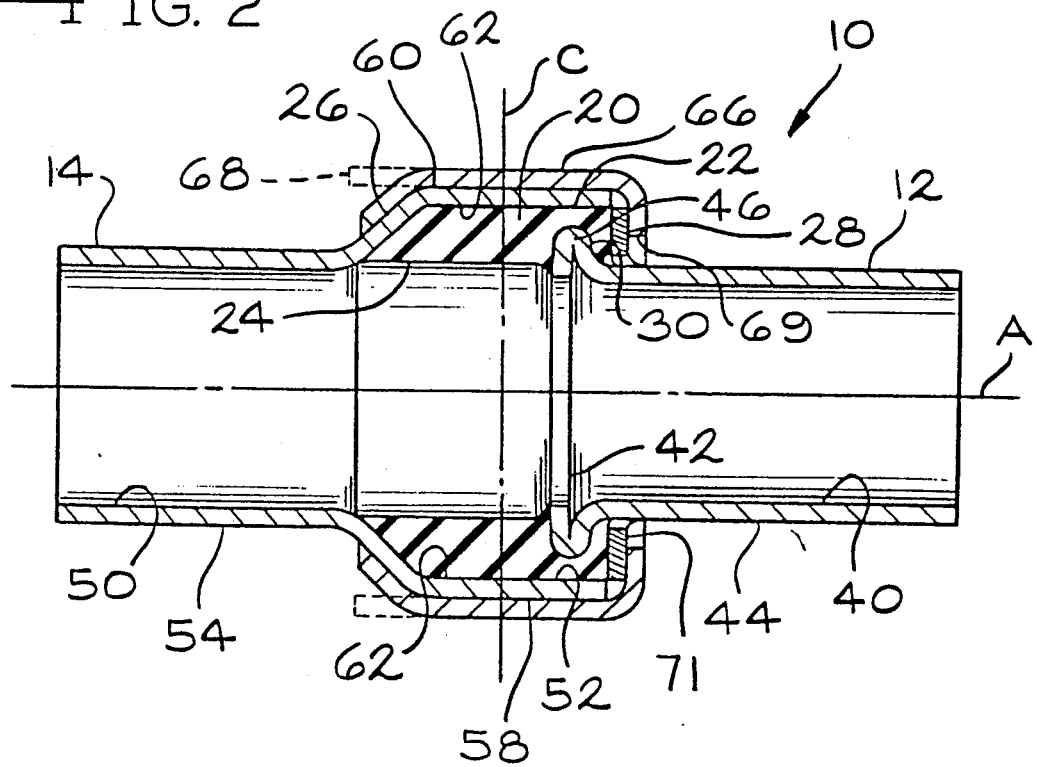
FIG. 2 is an enlarged cross-sectional view of an embodiment of a flexible joint according to the present invention.

A first embodiment of the present invention is shown in FIG. 2. The flexible joint 10 of this embodiment includes a first tubular section 12 and a second tubular section 14. The flexible joint further includes a flexible pad 20.

Still referring to FIG. 2, the flexible pad 20 includes an outer surface 22 and an inner surface 24, both of which extend along an axis A in a generally circular configuration. The flexible pad 20 further includes a first side 26 and a second side 28. A centerline C divides the flexible pad 20 into substantially equal parts. The flexible pad 20 has an indentation or contour portion 30 extending around the inner surface 24 of the pad 20. The contour portion 30 can be an annular groove. The contour portion 30 may have various configurations and still fall within the present invention. For example, the contour portion 30 may have a spherical configuration. In the present embodiment, the groove 30 extends around the inner surface 24 of the flexible pad 20 between the centerline C of the pad and the second side 28 of the pad. However, the groove 30 can also be located between the centerline C of the pad and the first side 26 depending on application.

The flexible pad 20 can be made of any suitable material depending on the application. It has been found that elastomeric materials are especially suitable for most applications. Examples of suitable elastomeric materials include synthetic rubber, natural rubber, neoprene or a urethane material. The use of an elastomeric material in the construction of the flexible pad 20 allows the pad to provide sound and vibration damping.

Still referring to FIG. 2, a first tubular section 12 is shown. The first tubular section 12 is formed of a wall 40 extending along an axis A to an open end 42. The wall 40 has a cylindrical outer surface 44. A raised portion 46 or lip is formed on the outer surface 44. The raised portion 46 is integral with the outer surface 44. The raised portion 46 and contour portion 30 can be a variety of geometric shapes. It has been found that circular, spherical and oblong shapes are preferred.

The raised portion 46 engages the contour portion 30 on the inner surface 24 of the flexible pad 20. This engagement maintains the first tubular section in proper alignment with the flexible pad 20. The flexible pad 20 can be molded on the first tubular section 12 and then cured while in place or it can be molded and cured and then placed on the first tubular section, depending on the application. The pad 20 may be bonded to one or both of the tubular sections 12 and 14.

A second tubular section 14 is also shown in FIG. 2. The second tubular section 14 is formed of a wall 50 extending along an axis A to an open end 52. The wall 50 has a cylindrical outer surface 54. An enlarged housing 58 is defined by the wall 50 at the open end 52 of the second tubular section 14. The housing 58 includes an exterior surface 60 and an interior surface 62. The interior surface 62 engages the outer surface 22 of the flexible pad 20 for retaining the pad in a sealing relationship with the first tubular section 12.

A second housing 66 extends over the exterior surface 60 of the housing 58 to provide additional structural support. The second housing 66 includes at least one lip 68 that can be swaged, rolled or otherwise deformed to encompass the flexible pad 20 and engage the exterior surface 60 of the housing 58. A gap 69 is preferably maintained between the housing 58 or the second housing 66 and the outer surface 44 of the first tubular section 12 to allow the flexible joint 10 and the tubular sections 12 and 14 to move as required in response to a force.

In the present embodiment, a containment element, such as a washer 71 is positioned around the first tubular section 12 between the elastomeric flexible pad 20 and the second housing 66. The washer 71 tends to retard elastomeric material from entering the gap 69.

The first and second tubular sections 12 and 14, respectively, can be made of a variety of materials depending on the application. Examples of suitable materials include metal and plastic, with metal being the preferred material.

The flexible pad 20 can be bonded or non-bonded to the first and second tubular sections 12 and 14, respectively, depending on the application. If the pad is non-bonded, a surface of synthetic resin polymers including a tetrafluoroethene homopolymer material, such as TEFLON ®, is preferably applied to the interior surface 62 of the housing 58 and the raised portion 46 of the first tubular section 12 to allow the pad to slide without additional lubrication.

Figure 3:
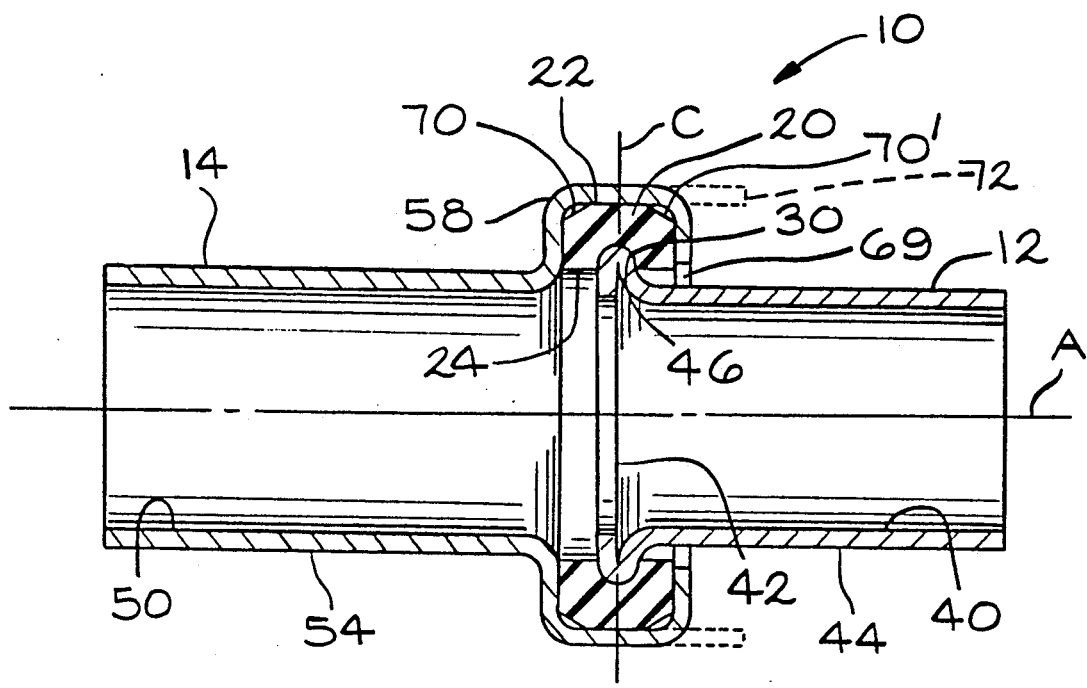
FIG. 3 is an enlarged cross-sectional view of another embodiment of a flexible joint according to the present invention.

A second embodiment of the invention is shown in FIG. 3. In this embodiment, the contoured portion 30 in the inner surface 24 of the flexible pad 20 is substantially along the centerline C of the pad. The raised portion 46 of the first tubular section 12 engages the contoured portion or groove 30 to maintain proper alignment between the first tubular section 12 and the flexible pad 20.

Still referring to FIG. 3, tapered edges 70 and 70' are included on the outer surface 22 of the flexible pad 20. The tapered edges 70 and 70' define relief areas to allow for the efficient insertion of the flexible pad 20 into the housing 58 during assembly of the flexible joint 10.

A housing lip 72 is included as part of the housing 58. The housing lip 72 is rolled or bent over the flexible pad 20 during assembly of the flexible joint 10.

Figure 4:
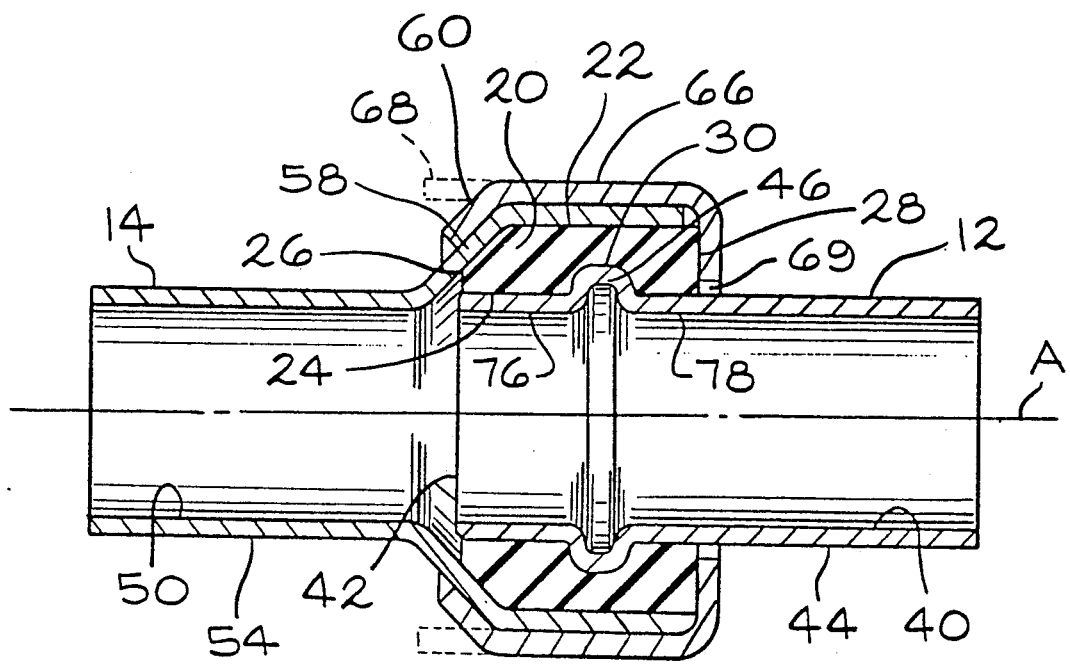
FIG. 4 is an enlarged cross-sectional view of still another embodiment of a flexible joint according to the present invention.

A third embodiment of the invention is shown in FIG. 4. In this embodiment, the flexible pad 20 has an outer surface 22, an inner surface 24, a first side 26 and a second side 28. A contoured portion or groove 30 extends around the inner surface 24 of the pad 20.

A first tubular section 12 including a wall 40 extends around an axis A to an open end 42. The wall 40 has a cylindrical outer surface 44. A raised annular portion 46 is integral with the outer surface 44. The raised portion 46 is received by the groove 30 and is positioned between a first portion 76 of the wall 40 and a second portion 78 of the wall 40. The first portion 76 engages the inner surface 24 of the flexible pad 20 in the area adjacent the first side 26 to support or "stiffen" the pad. This makes the pad 20 relatively inflexible depending on the application. The raised portion 46 engages the contoured portion 30 on the inner surface 24 of the pad 20.

Referring to FIG. 4, a second housing 66 having a lip 68 engages the exterior surface 60 of the housing 58. This provides additional structural support to the housing 58.

It should be understood that many changes can be made to the flexible joint disclosed in the drawings and still fall within the scope of the following claims.

We claim:

1. A flexible joint for the sealing of tubular sections comprising, in combination:

a flexible pad, said pad having inner and outer surfaces that extend along an axis in a generally circular configuration, said pad further having first and second sides divided by a centerline into substantially equal parts, said pad having a contoured portion having a geometric configuration extending around said inner surface between said centerline of said pad and said second side of said pad;

a first tubular section formed of a wall extending along an axis to an open end, said wall having a cylindrical outer surface, said outer surface having an outwardly extending raised portion having a geometric configuration similar to the geometric configuration of said contoured portion on said inner surface of said pad, said raised portion engaging said contoured portion on said inner surface of said pad to maintain said first tubular section in proper alignment with said flexible pad;

a second tubular section formed of a wall extending along an axis to an open end, said wall having a cylindrical outer surface, said outer surface having an integral enlarged housing defined by said wall of said second tubular section, said housing having exterior and interior surfaces, said interior surface of said housing directly engaging said outer surface of said pad for retaining said pad in a sealing relationship with said first tubular section;

a second housing extending over and engaging said exterior surface of said housing, said second housing including a lip that engages said exterior surface of said housing, a gap maintained between said housing and said second housing and said outer surface of said first tubular section, whereby said gap allows said flexible joint and said first and second tubular sections to move in response to force; and a containment element positioned around said first tubular section between said flexible pad and said second housing, whereby said containment element retards said flexible pad from entering said gap.

2. The flexible joint of claim 1, wherein said flexible pad is comprised on an elastomeric material.

3. The flexible joint of claim 1, wherein said flexible pad includes at least one tapered edge on said outer surface of said pad, said tapered edge defining a relief area.

4. The flexible joint of claim 1, wherein said contoured portion in said flexible pad comprises an annular groove.

5. The flexible joint of claim 1, wherein said flexible pad is bonded to at least one said first and second tubular sections.

6. The flexible joint of claim 1, wherein layers of synthetic resin polymers are positioned on said interior surface of said housing and on said raised portion of said first tubular section.

7. A flexible joint for the sealing of tubular sections comprising, in combination:

a flexible pad, said pad having inner and outer surfaces that extend along an axis in a generally circular configuration, said pad having first and second sides, said pad having a centerline dividing said first and second sides into substantially equal parts, said pad having a contoured portion having a geometric configuration extending around said inner surface of said pad generally at such centerline;

a first tubular section formed of a wall extending along an axis to an open end, said first tubular section having a raised portion having a geometric configuration similar to said geometric configuration of said contoured portion on said inner surface of said pad, said raised portion engaging said contoured portion on said inner surface of said pad to maintain said first tubular section in proper alignment with said flexible pad;

a second tubular section formed of a wall extending along an axis to an open end, said wall having a cylindrical outer surface, said outer surface defining an integral enlarged housing defined by said wall of said second tubular section, said housing having exterior and interior surfaces, said interior surface of said housing directly engaging said outer surface of said pad for retaining said pad in a sealing relationship with said first tubular section;

a second housing extending over and engaging said exterior surface of said housing, said second housing including a lip that engages said exterior surface of said housing, a gap maintained between said housing and said second housing and said outer surface of said first tubular section, whereby said gap allows said flexible joint and said first and second tubular sections to move in response to force; and a containment element positioned around said first tubular section between said flexible pad and said second housing, whereby said containment element retards said flexible pad from entering said gap.

8. The flexible joint of claim 7, wherein said flexible pad is comprised of an elastomeric material.

9. The flexible joint of claim 7, wherein said flexible pad includes at least one tapered edge on said upper surface of said pad.

10. The flexible joint of claim 7, wherein said contoured portion in said flexible pad comprises an annular groove.

11. The flexible joint of claim 7, wherein said flexible pad is bonded to at least one of said first and second tubular sections.

12. The flexible joint of claim 7, wherein layers of synthetic resin polymers are positioned on said interior surface of said housing and said raised portion of said first tubular section.

13. A flexible joint for the sealing of tubular sections comprising, in combination:

a flexible pad, said pad having inner and outer surfaces that extend along an axis in a generally circular configuration, said pad having first and second sides divided by a centerline into substantially equal parts, said pad having a contoured portion having a geometric configuration extending around said lower surface;

a first tubular section including a wall extending along an axis to an open end, said wall having a cylindrical outer surface, said tubular section having a raised portion having a geometric configuration similar to the geometric configuration of said contoured portion of said inner surface of said pad integral with said cylindrical outer surface, said raised portion being positioned between first and second portions of said wall, said first portion of said wall engaging said first side of said pad to support said pad to make said pad less flexible, said raised portion being received by said contoured portion on said lower surface of said pad to maintain said first tubular section in proper alignment with said flexible pad;

a second tubular section formed of a wall extending along an axis to an open end, said wall having a cylindrical outer surface, said outer surface of said second tubular section defining an integral enlarged housing defined by said wall of said second tubular section, said housing having exterior and interior surfaces, said interior surface of said housing directly engaging said outer surface of said pad for retaining said pad in a sealing relationship with said first tubular section;

a second housing extending over and engaging said exterior surface of said housing, said second housing including a lip that engages said exterior surface of said housing, a gap maintained between said housing and said second housing and said outer surface of said first tubular section, whereby said gap allows said flexible joint and said first and second tubular sections to move in response to force; and a containment element positioned around said first tubular section between said flexible pad and said second housing, whereby said containment element retards said flexible pad from entering said gap.

14. The flexible joint of claim 13, wherein said flexible pad is comprised of an elastomeric material.

15. The flexible joint of claim 13, wherein said flexible pad includes at least one tapered edge on said upper surface of said pad.

16. The flexible joint of claim 13, wherein said contoured portion in said flexible pad is an annular groove.

17. The flexible joint of claim 13, wherein said flexible pad is bonded to at least one of said first and second tubular sections.

18. The flexible joint of claim 14, wherein layers of synthetic resin polymers are positioned on said interior surface of said housing and said raised portion of said first tubular section.

* * * * *